United States Patent [19]
McMaster

[11] 4,161,068
[45] Jul. 17, 1979

[54] APPARATUS AND METHOD FOR ALIGNING SHAFTS

[76] Inventor: Thomas M. McMaster, 1490 Donnelly Rd., Mt. Vernon, Wash. 98273

[21] Appl. No.: 855,752

[22] Filed: Nov. 30, 1977

[51] Int. Cl.² .............................................. G01B 5/24
[52] U.S. Cl. .................................... 33/412; 33/180 R
[58] Field of Search .................. 33/84, 180 R, 180 B, 33/181 R, 182, 1 N; 356/153; 73/460

[56] References Cited

U.S. PATENT DOCUMENTS

| | | | |
|---|---|---|---|
| 2,246,002 | 6/1941 | Powers | 33/355 |
| 2,634,939 | 4/1953 | Voss | 33/84 |
| 2,656,607 | 10/1953 | Harding | 33/84 |
| 3,192,631 | 7/1965 | Goguen et al. | 356/153 |
| 3,783,520 | 1/1974 | King | 33/180 R |
| 3,783,522 | 1/1974 | Dodd | 33/180 R |
| 4,115,925 | 9/1978 | Malak | 33/181 R |

Primary Examiner—Richard E. Aegerter
Assistant Examiner—John W. Shepperd
Attorney, Agent, or Firm—Morris A. Case

[57] ABSTRACT

A two part tool for aligning a pair of shafts. One tool part has two surfaces at 90 degrees from each other with each surface having a series of parallel lines, and an instrument for measuring distances parallel to an axis of a shaft from both a horizontal and a vertical direction. The second tool part provides for extending two clear parallel lined members to extend over and cover the cooperating lined surfaces on the first tool part and exhibit a Moire fringe pattern if the shafts are not angularly aligned, and an extendable target to cooperate with the instrument for measuring displacement parallel to the axis of the shaft.

30 Claims, 12 Drawing Figures

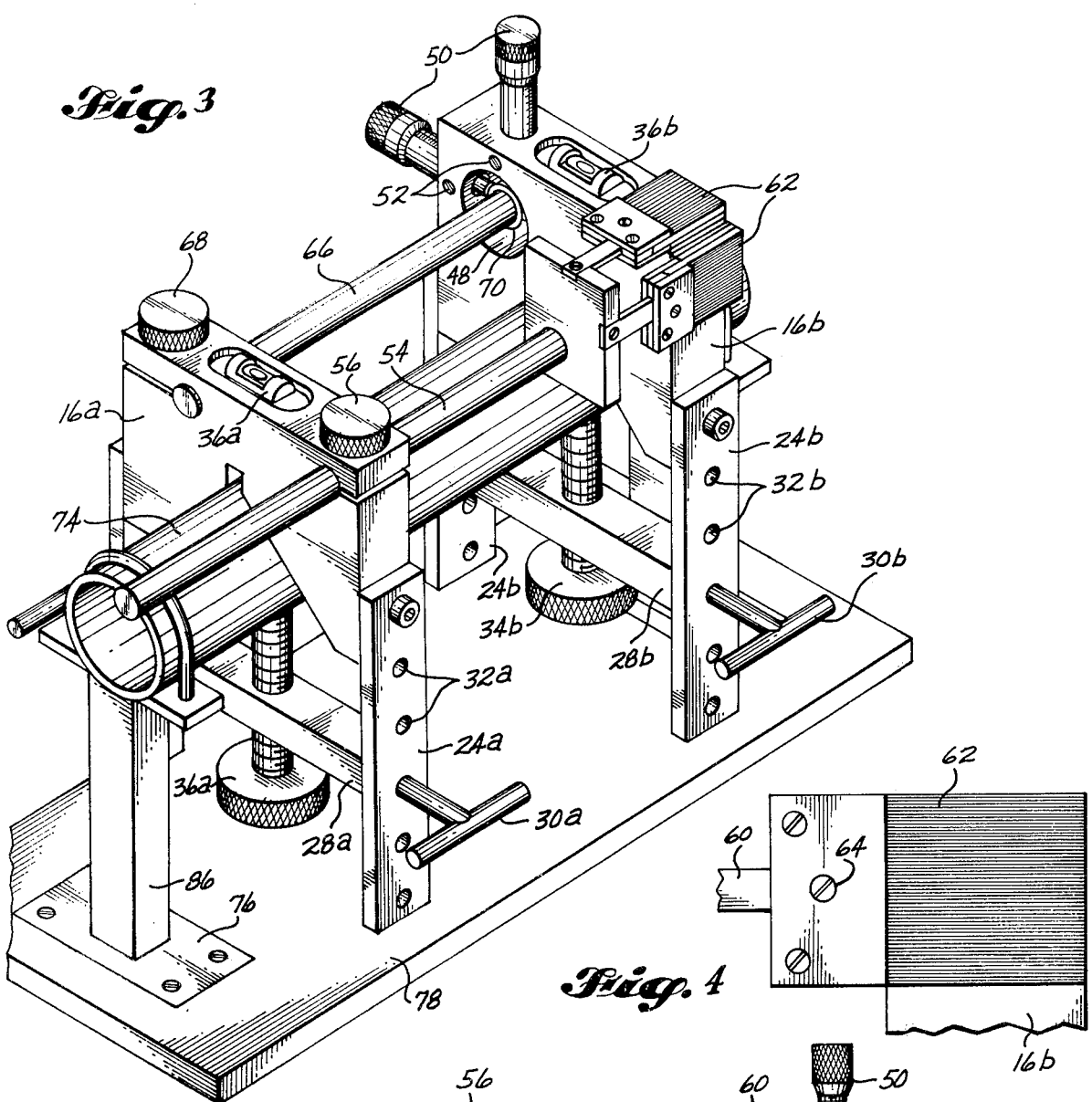
Fig. 3
Fig. 4
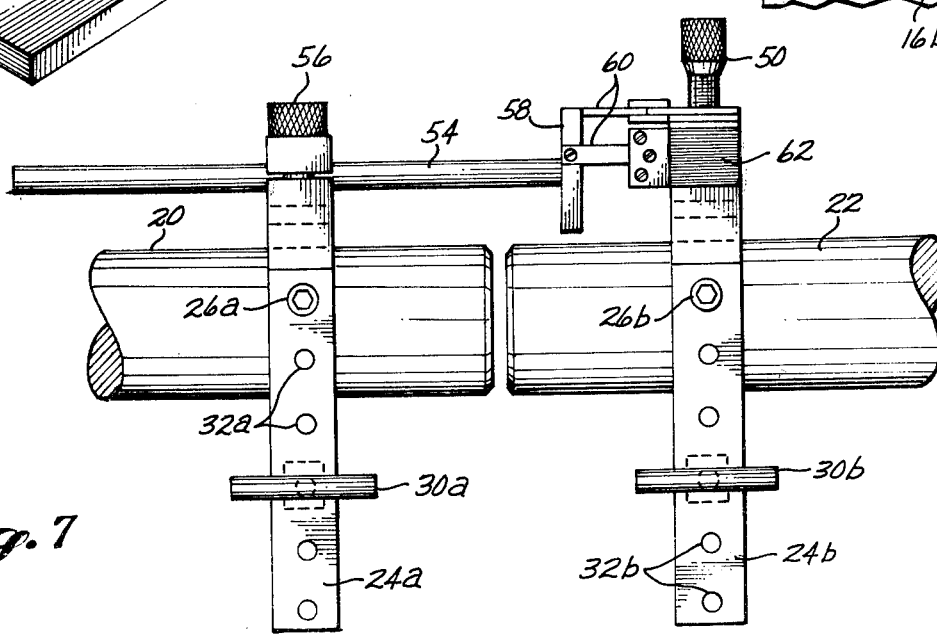
Fig. 7

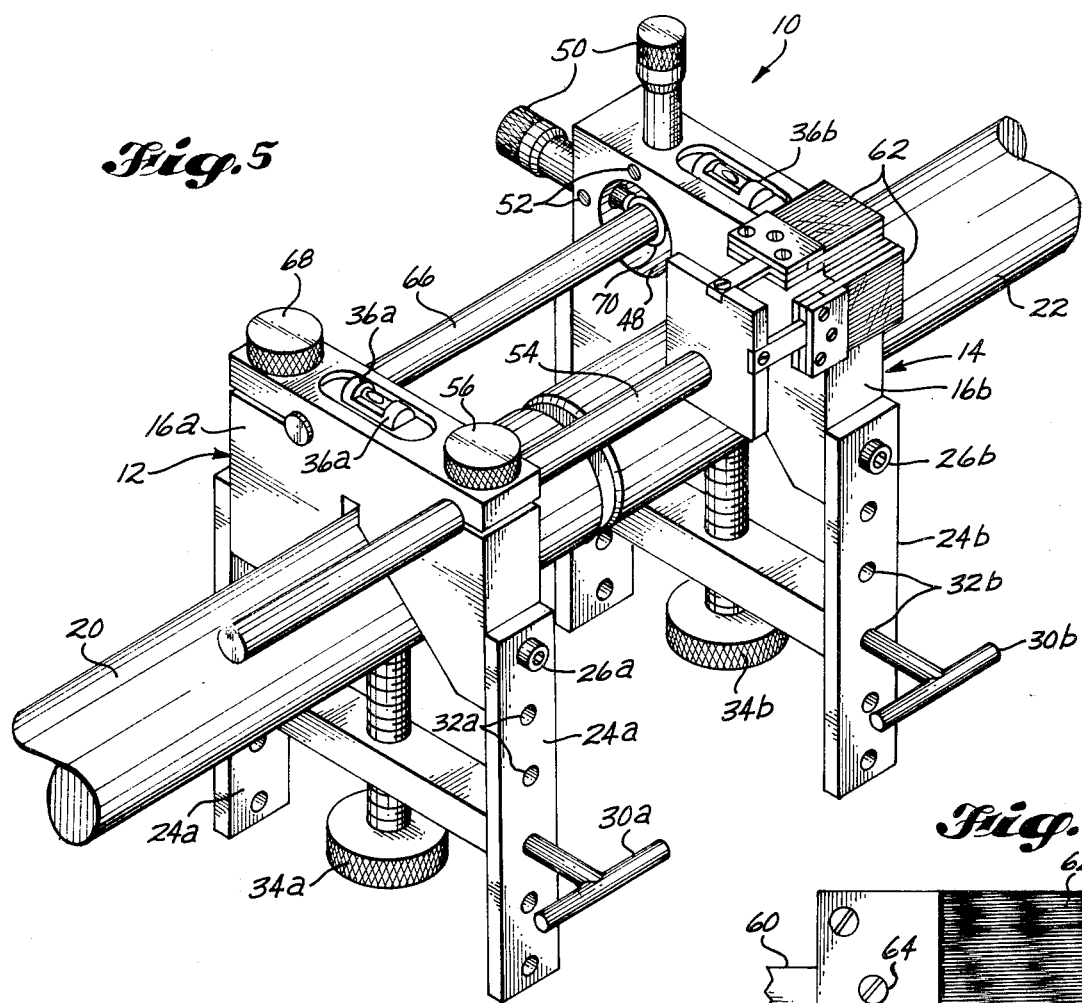
Fig. 5
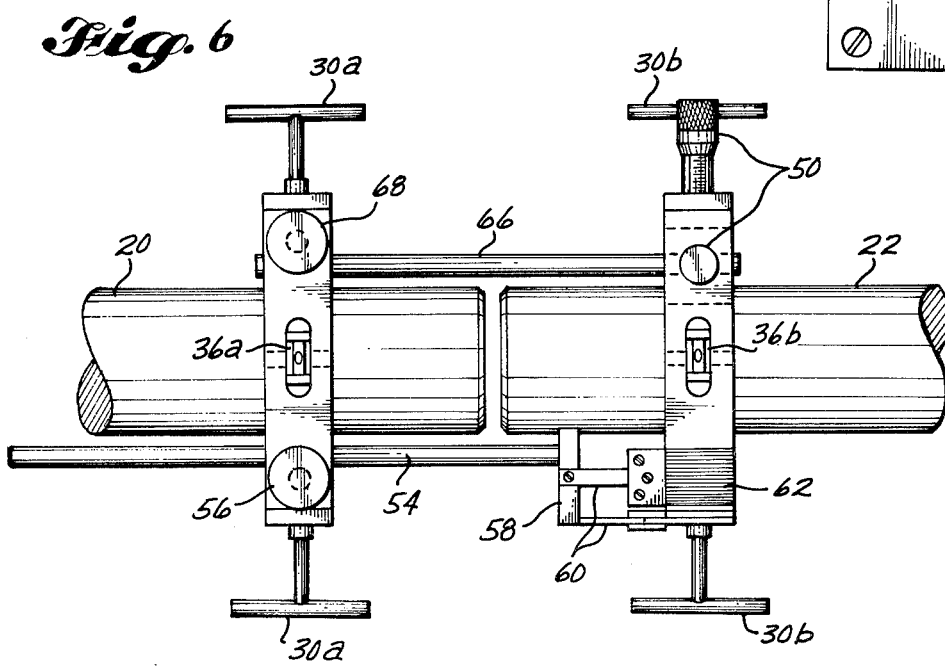
Fig. 6
Fig. 8

APPARATUS AND METHOD FOR ALIGNING SHAFTS

BACKGROUND OF THE INVENTION

Aligning a pair of shafts can be a time consuming task. One of the methods presently used mounts an adjustable dial indicator on one of the shafts and contacting the top of the other shaft. The indicator is set at zero and the shaft with dial indicator rotated and readings taken at 90 degree intervals around the circumference of the stationary shaft. These readings are used to interprete parallel misalignment between the two shafts. Next the stem of the dial indicator is rested on the end of and near the outside diameter of the stationary shaft. The dial is set on zero, the shaft rotated and readings again taken at 90 degree intervals to determine angular displacement. One of the shafts is moved and the process repeated until it checks out properly. When the shafts are experiencing parallel misalignment in two directions and angular misalignment in two directions it is very difficult to visualize the three dimensional position of one shaft with respect to the other in order to make the correct moves. Another known method of aligning two shafts use reverse indicator readings. In this method a dial indicator is placed on one shaft contacting the outer diameter of the other shaft and readings are taken at 90 degree intervals. Next the dial indicator is placed on the other shaft contacting the first shaft and readings are taken. These readings are plotted to determine needed movement to obtain proper alignment. A time consuming method that also requires considerable training.

In U.S. Pat. No. 3,192,631 to Goguen, et al- a pair of telescopes with parallel axial alignment with respect to an end of a long shaft were used to sight on a pair of targets aligned as to the telescopes with the targets movable along the shaft to check on shaft alignment.

It was discovered that a pair of shafts may be directly aligned without the need to rotate either of the shafts.

SUMMARY OF THE INVENTION

Components of a tool for axially aligning a pair of shafts are mounted on two V-block tool bases. One tool base supports two plates each etched with a series of evenly spaced lines running parallel to each other and each plate located at 90 degrees from each other, and also supports measuring instruments for determining two directional alignment parallel to the axis of a shaft. The second tool base supports a pair of clear plates sized located and parallel lined to match the plates located on the first tool base with the matching plates axially movable to extend over and cover the first set of plates, and an adjustable target axially movable to cooperate with the parallel alignment measuring instruments.

One of the tool bases is mounted to each of a pair of shafts to be aligned and the cooperating members extended to measure angular and parallel alignment.

It is an object of this invention to provide a tool for quickly aligning a pair of shafts.

It is another object of this invention to provide a tool for aligning a pair of shafts without the necessity of rotating either of the shafts.

DESCRIPTION OF THE DRAWINGS

FIG. 3 shows the tool of FIG. 1 mounted to the calibration bar.

FIG. 4 shows a fragmented plan view of calibrated paired ronchi rulings of this invention.

FIG. 5 shows a perspective view of the alignment tool of FIG. 1 mounted to a pair of fragmented shafts.

FIG. 6 is a plan view, and FIG. 7 is a side elevational view of the tool mounted as in FIG. 5.

FIG. 8 shows the ronchi rulings of FIG. 4 when the alignment tool is mounted to angularly misaligned shafts.

DETAILED DESCRIPTION

Figure 10:
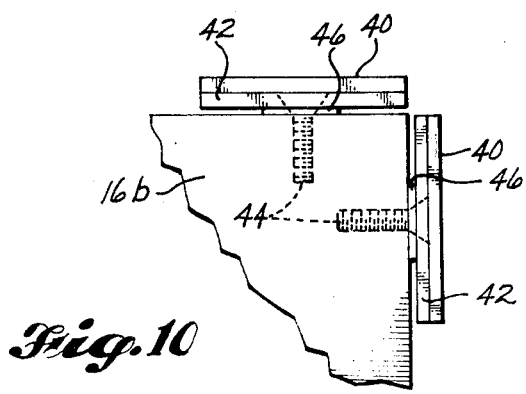
FIG. 10 is a fragmented end view of a corner of a tool block taken along lines 10—10 of FIG. 1.

An alignment tool 10 is made up of two cooperating tool parts 12 and 14. The cooperating parts are each made from a rectangular tool block or tool base 16a and 16b; which have a V-shaped underside or notch 18a and 18b cut to permit the block to sit astride shafts, 20 and 22, to be aligned. Straps 24a and 24b extend down from and are secured to the blocks with fasteners 26a and 26b. The plates in turn are secured to cross members 28a and 28b with T-pins 30a and 30b. The straps have a series of holes 32a and 32b through which the T-pins are selectively inserted to permit adjusting to various size shafts. Clamp screws 34a and 34b thread through the cross members to secure the block to the shaft. Levels 36a and 36b are located along the top of the block and opposite the point of the V in the notch. It is preferred these levels be super accurate level vials with each graduation equaling about 90 seconds or about 0.025 angular degrees. Adjacent edge 38 of tool base 16b lie a pair of glass plates 40 at 90 degrees from each other. Each of these plates have a series of evenly spaced lines running parallel to each other, known as ronchi rulings. The plates, as best shown in FIG. 10, are adhesively joined to support plates 42 which in turn are secured to tool base 16b by screws 44. Washers 46 between the support plate and the block acting in cooperation with the hold down screws tightly hold the plates in a manner to permit rotating the plates to change the angular alignment of the ronchi rulings and to firmly hold the plates in the new position. The tool base 16b has an opening or hole 48 aligned to be parallel to the axis of the shaft 22 when the tool base is mounted on the shaft. A pair of micrometers 50 are held to the tool base with set screws 52. The micrometers are aligned to extend radially with respect to the axis of the hole in the base, to extend at 90 degrees to each other, and in this embodiment to extend horizontally and vertically with respect to the mounted tool base.

A rod 54 is mounted to tool base 16a in a manner to extend toward tool base 16b along a line parallel to the axis of shaft 20 to which base 16b is mounted. The rod is adjustably secured by use of a screw having a knurled head 56 to permit quick locking and unlocking of the rod. A plate 58 joined to the end of the rod supports a pair of brackets 60 which in turn hold a pair or set of clear flat members 62 preferably of glass, but they may be of other clear materials. These members are located at 90 degrees from each other, are lined with ronchi rulings identical to the rulings on plates 40, and will cover and match those rulings when the rod is extended. It is preferred the ruled plates 40 and matching ruled members 62 be close together. Therefore, it is preferred the brackets 60 be of spring steel to permit deflection, if required, as the members move over the plates. Fasteners 64 in the brackets 60 permit alignment of the ronchi rulings on the plates 62. A target rod 66 is mounted to the tool base 16a in a manner to extend toward tool base 16b along a line parallel to the axis of the shaft 20 to which the tool base is mounted and to extend into opening 48. The rod is adjustably secured by screw having a knurled head 68 to permit quick locking or unlocking. A target ring 70 having a circular outside diameter is secured near the end of rod 66.

Figure 2:
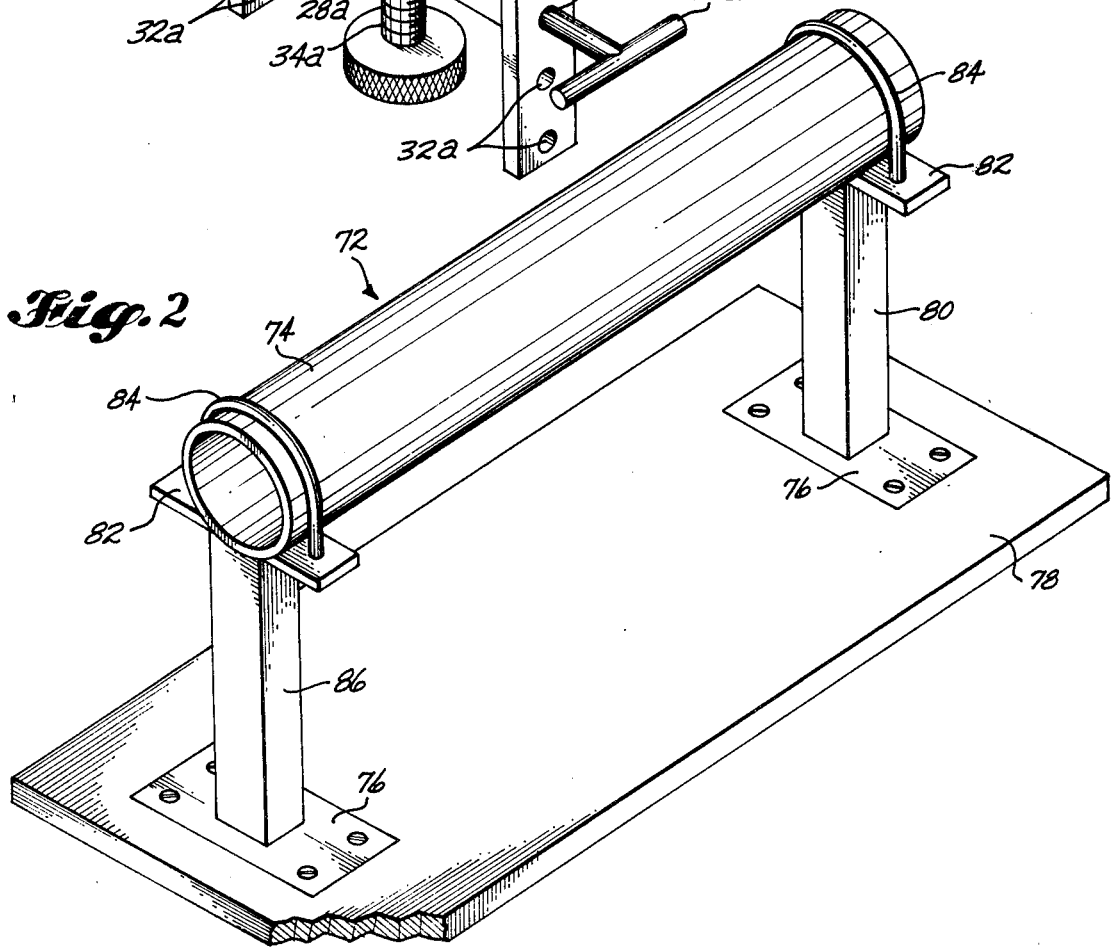
FIG. 2 is a perspective view of a calibration bar for calibrating the tool of FIG. 1.

A calibration bar 72 is used to calibrate cooperating tool parts 12 and 14. This calibration bar as best shown in FIG. 2, has a tube or bar 74 preferably straight to within 0.0005 inches to provide zero alignment. Base plates 76 are secured to a base 78 and support vertical members 80 having cross members 82. The tube is joined with U-clamps 84 to the cross members to securely fasten the tube to the base.

Preferably the calibration bar is used to zero or calibrate the alignment tool each time it is used. The straightness of the bar simulates a condition of perfect alignment between two separate shafts. The tool 10 is zeroed by placing the V-part of the tool bases 16a and 16b on the calibration bar 72 at a distance equal to the distance between them when they will be mounted on shafts to be aligned. The blocks are adjusted by use of the level vials 36a and 36b and clamped in place with clamp screws 34a and 34b. The target rod 66 is then extended until the target ring 70 is directly under the micrometers 50. The micrometers are each extended until contact is made with the target ring and readings recorded to show the horizontal and vertical readings for the condition of perfect parallel alignment. It is understood these readings could be obtained without the target ring by having the micrometers contact the target rod, however, it is preferred to use the target ring. Next the rod 54 for supporting the plates 62 with ronchi rulings is extended; so that these plates cover the ronchi rulings of plates 40. Moire patterns or intereference fringe patterns, as shown in FIG. 8, will then be visible provided the two sets of ruled plates are not in angular alignment. If the plates are misaligned this can be corrected by rotating one of the matching plates until only parallel lines are seen, as shown in FIG. 4. When the Moire patterns disappear the ruling are calibrated to indicate perfect angular alignment as it is known the calibration bar gives perfect alignment.

The calibration tool parts 12 and 14 are then removed from the calibration bar 72 and placed with tool part 12 on shaft 20 and tool part 14 on shaft 22, preferably at the same distance apart as was used on the calibration bar. They are each leveled and then clamped to those shafts. Rod 54 is extended until plates 62 cover plates 40. If the shafts are out of either horizontal or vertical angular alignment, Moire fringe patterns will be visible in the misaligned direction. The spacing of the interference fringes will indicate the severity of misalignment. One or the other of the shafts will be moved angularly in the proper direction until the interference fringe patterns disappear; which shows the two shafts are then in angular alignment. Next the target rod is advanced until the target ring lies under the micrometers. The micrometers are advanced to contact the ring, readings taken in the horizontal and in the vertical direction, and compared with those readings obtained during calibration. The difference, if any, gives the amount of parallel misalignment. One or the other of the shafts are then moved along a line parallel to its axis until the micrometer readings are identical to the calibrated readings; which shows the two shafts are also in parallel alignment.

Figure 1:
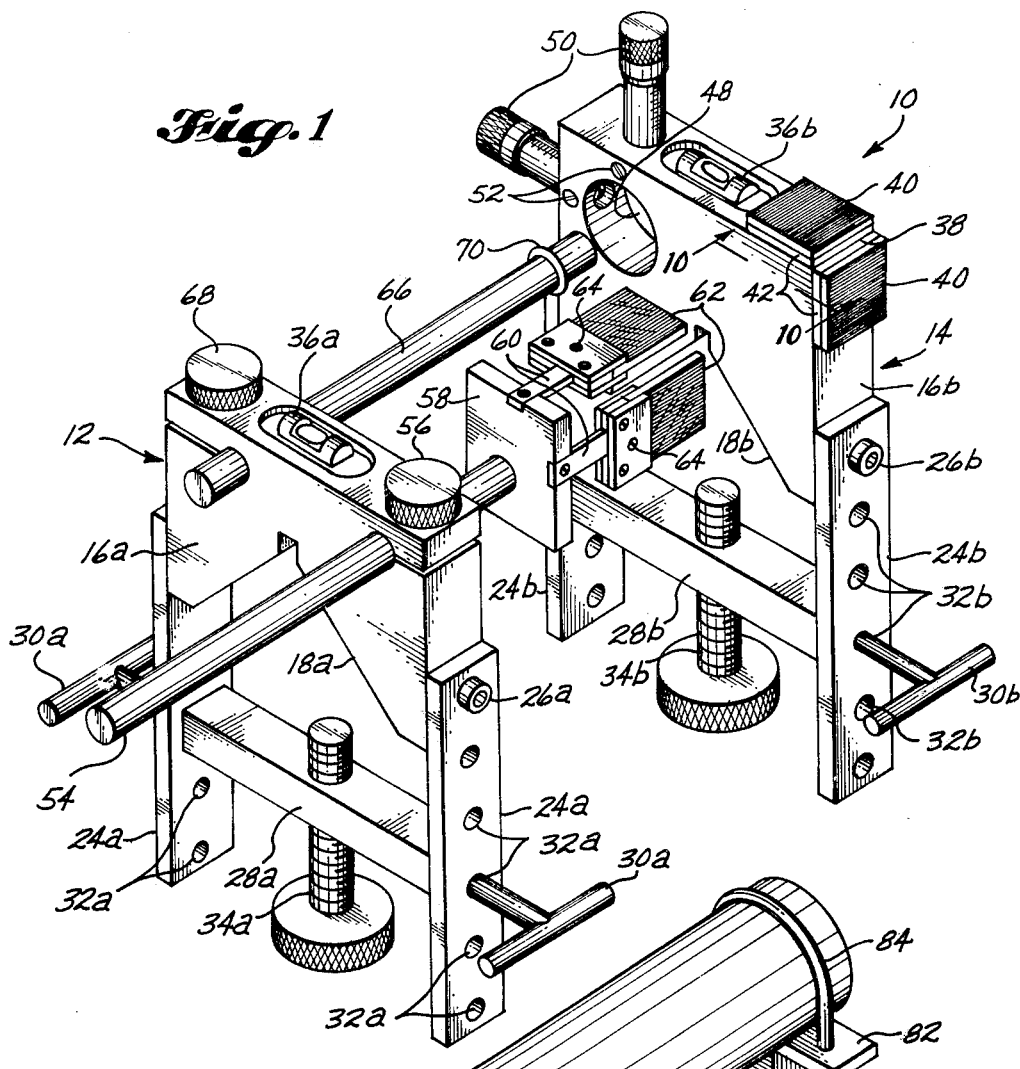
FIG. 1 shows a perspective view of the alignment tool of this invention.
Figure 9:
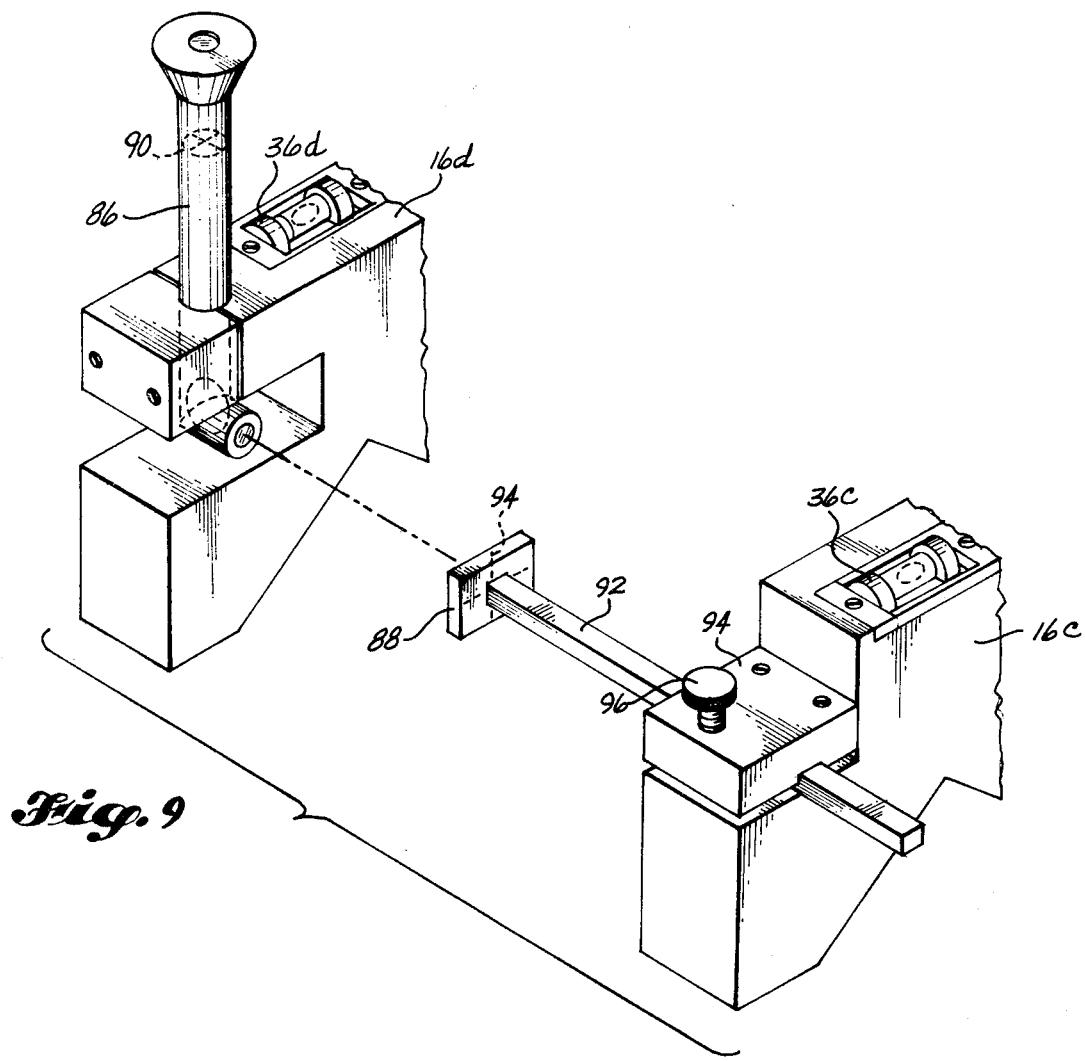
FIG. 9 shows a fragmented perspective view of a different embodiment of this invention.

In the embodiment as shown in FIG. 9 a microscope 86 is used in combination with a target 88 as the means for determining parallel misalignment. The microscope with cross hairs 90 is mounted to tool block or tool base 16d and is directed toward tool block 16c along an axis parallel to an axis of calibration bar 72 to which the tool block may be mounted. The target is affixed to a rod 92; which is mounted to tool block 16c with bar 94 and fastener 96. When block 16c is mounted to calibration bar 72 the rod 92 extends toward and along the axis of the microscope with cross hairs 94 perfectly aligned with the cross hairs in the microscope. When using this embodiment the angular alignment cooperating parts will be as shown in FIG. 1.

When block 16c and 16d are mounted to a pair of shafts that are out of parallel alignment the amount of horizontal or vertical misalignment can be read directly from the difference between the cross hairs on the microscope and the target.

Figure 11:
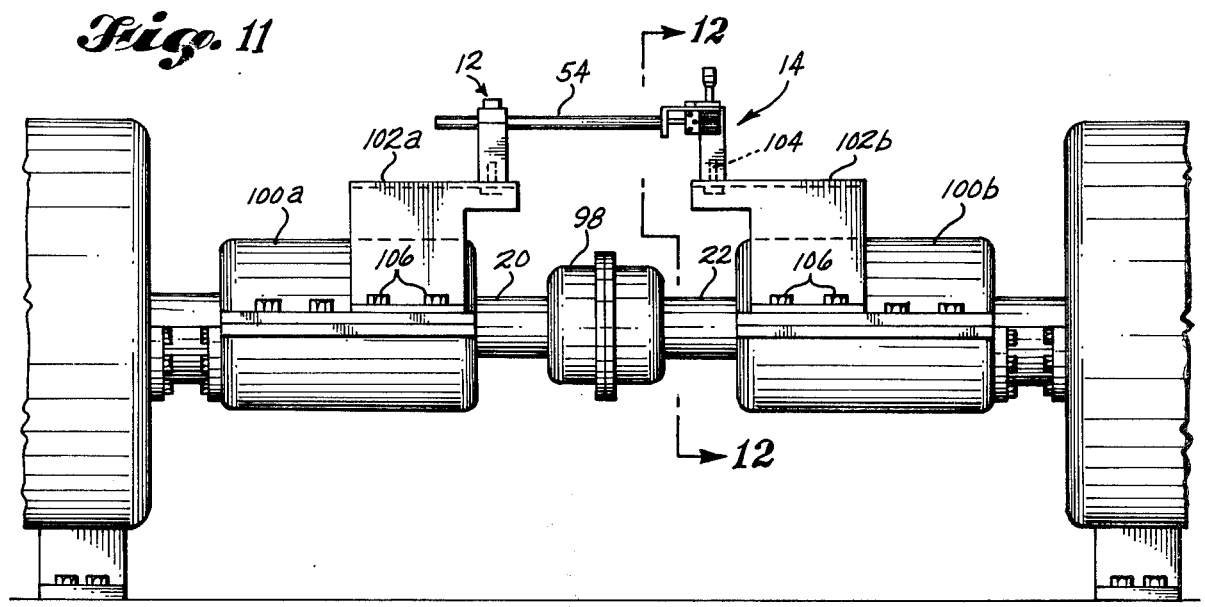
FIG. 11 is a fragmented side elevational view showing the alignment tool of this invention mounted to bearings.
Figure 12:
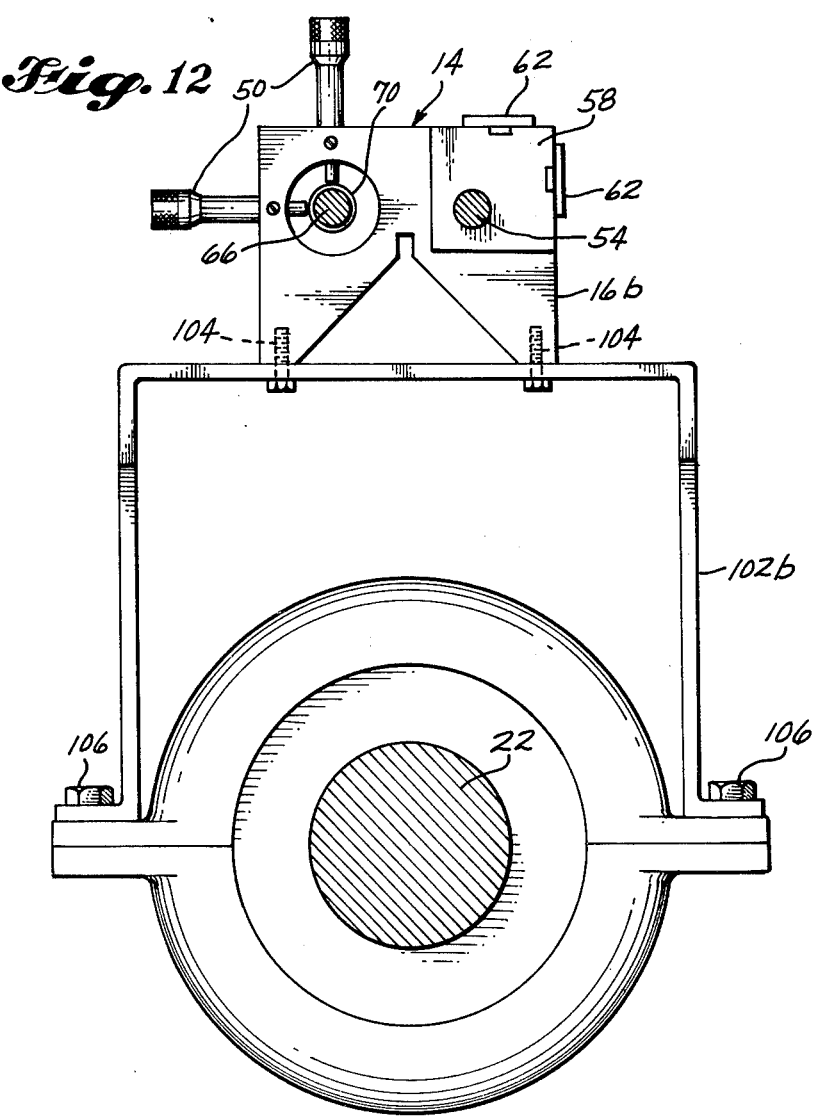
FIG. 12 is a sectional view taken along lines 12—12 of FIG. 11.

A pair of coupled together shafts that are perfectly aligned may become misaligned upon being rotated together at operating conditions. As the operating speeds are reached thermal growth of one unit with respect to the other may cause a troublesome misalignment. FIGS. 11 and 12 show the alignment tool 10 being used to measure alignment of shafts 20 and 22 when the shafts are rotating at operating speeds. The aligned shafts are joined together by coupling 98 with shaft 20 mounted to bearing 100a and shaft 22 mounted to bearing 100b. For use in this embodiment members used to fasten the tool parts 12 and 14 to the shafts are not required. The tool parts 12 and 14 are mounted to adapter members 102a and 102b by use of bolts 104, and the adapter members in turn are mounted with bolts 106 to bearings 100a and 100b respectively.

When checking for thermal growth on a pair of aligned shafts an alignment tool 10 is mounted onto bearings supporting the aligned shafts and the shafts rotated at operating speeds for a time sufficient to obtain stable conditions. The aligning tool is read to determine whether the shafts stayed in alignment. If the shafts are noted to be misaligned at the operating conditions the rotation is stopped, one of the shafts moved with respect to the other as required, and again checked for alignment at operating conditions.

I claim:

1. A method of axially aligning a pair of shafts utilizing a pair of aligning tools having cooperating measuring means for determining angular displacement from a horizontal and from a vertical direction by matching plates with ronchi rulings for displaying a Moire fringe pattern when angularly misaligned, and a cooperating measuring means for determining parallel displacement from a horizontal and from a vertical direction, the steps comprising: placing one of a pair of aligning tools on one of a pair of shafts to be aligned; placing the other aligning tool on the other shaft; placing plates with ronchi rulings over matching plates with ronchi rulings by extending a rod with plates from one of the aligning tools to cover plates on the other aligning tool; angularly moving one of the shafts until Moire fringe patterns disappear from the plates in both the horizontal and the vertical directions; matching parallel displacement means and moving the axis of one of the shafts in a parallel direction until parallel measuring means indicate the axis is the same on both shafts.

2. A method of axially aligning a pair of shafts as in claim 1, steps further comprising: mounting the aligning tools on a calibration bar, and calibrating the angular and the parallel measuring means before placing the tools on shafts to be aligned.

3. A method of axially aligning a pair of shafts as in claim 1 wherein matching the parallel displacement utilizes a microscope in cooperation with a target having a cross hair and the steps comprise: looking into a microscope mounted to one of the aligned tools, and measuring the amount of parallel misalignment by comparing a cross hair inside the microscope with a cross hair on a target extending from the cooperating aligning tool.

4. A method of axially aligning a pair of shafts as in claim 1 wherein the steps of matching the parallel displacement means comprises: extending a rod from one of the aligning tools to an opening in a second one of the aligning tools, contacting the side of the rod with a radially extending micrometer, contacting the side of the rod with a second radially extending micrometer at 90 degrees from the first micrometer, and comparing the micrometer readings with previously obtained perfectly aligned calibration readings.

5. An apparatus for aligning a pair of shafts comprising: a pair of blocks having means for aligning and leveling a separate block on each of a pair of shafts to be aligned, cooperating ronchi ruling means extending between the two blocks for indicating angular misalignment by exhibiting a Moire fringe pattern, and a second cooperating means extending between the two blocks for measuring parallel misalignment between the shafts.

6. An apparatus for aligning a pair of shafts as in claim 5 wherein the means for measuring a parallel misalignment comprises a microscope and target means.

7. An apparatus for aligning a pair of shafts as in claim 5 wherein the means for measuring parallel misalignment comprises: a rod to extend parallel to the shaft from one of the blocks toward the second block, and a micrometer mounted to the second block to extend radially with respect to the extended rod to contact the rod.

8. An apparatus for aligning a pair of shafts as in claim 5 further comprising adapting means for mounting the blocks with cooperating angular and parallel alignment means on bearings to which aligned shafts are mounted to determine and measure thermal growth between coupled aligned shafts as the shafts rotate under operating conditions.

9. An apparatus for aligning a pair of shafts comprising: a pair of blocks, means for aligning a separate block of the pair on each of a pair of shafts to be aligned, a pair of flat members at 90 degrees from each other on one of the blocks with the members each parallel to the shaft on which the block is mounted and each having a series of parallel lines, a second pair of matching parallel lined flat clear members, means for extending the second pair of lined members from the second block to cover the first pair of lined members to determine angular alignment, and cooperating means extending between the blocks for measuring parallel alignment of the shafts.

10. An apparatus for aligning a pair of shafts as in claim 9 further comprising means for adjustably rotating at least one set of the lined members to calibrate the setting between cooperating lined members.

11. An apparatus for aligning a pair of shafts as in claim 9 further comprising adapting means for mounting the blocks with cooperating angular and parallel alignment means on bearings to which aligned shafts are mounted to determine and measure thermal growth between coupled aligned shafts as the shafts rotate under operating conditions.

12. An apparatus for aligning a pair of shafts as in claim 9 wherein the means for aligning a separate block on each shaft comprises: each block having a V-shape for mounting astride the shaft, and each block having a level means to control rotational positioning of the block on the shaft.

13. An apparatus for aligning a pair of shafts as in claim 9 wherein the cooperating means for measuring parallel alignment of the shafts comprises a rod to adjustably extend from one of the shaft mounted blocks along a line parallel to the axis of the shaft; a target mounted to the end of the rod toward the other block, said other block having a mounted microscope directed along a line parallel to the shaft, toward the target, and having a cross hair to sight on cross hairs on the target and measure the amount of parallel misalignment.

14. An apparatus for aligning a pair of shafts as in claim 13 further comprising adapting means for mounting the blocks with cooperating angular and parallel alignment means on bearings to which aligned shafts are mounted to determine and measure thermal growth between coupled aligned shafts as the shafts rotate under operating conditions.

15. An apparatus as in claim 13 further comprising means for adjustably rotating at least one set of the lined members to calibrate the setting between cooperating lined members.

16. An apparatus for aligning a pair of shafts as in claim 9 wherein the cooperating means for measuring parallel alignment of the shafts comprises: a rod to adjustably extend from one of the shaft mounted blocks along a line parallel to the axis of the shaft and into an opening in the other block, a micrometer mounted in the other block to extend into the opening to contact the rod to measure parallel alignment, and a second micrometer mounted at 90 degrees to the first micrometer and located to extend into the opening to contact the rod to measure parallel alignment from a different direction.

17. An apparatus for aligning a pair of shafts as in claim 16 further comprising a ring, having rounded outer cross-section, located on the rod at a position to be contacted by the ends of the micrometers.

18. An apparatus for alignimg a pair of shafts as in claim 16 further comprising means for adjustably rotating at least one set of the lined members to calibrate the setting between cooperating lined members.

19. An apparatus for aligning a pair of shafts as in claim 16 further comprising adapting means for mounting the blocks with cooperating angular and parallel alignment means on bearings to which aligned shafts are mounted to determine and measure thermal growth between coupled aligned shafts as the shafts rotate under operating conditions.

20. An apparatus for aligning a pair of shafts as in claim 16 wherein the means for aligning a separte block on each shaft comprises: each block having a V-shape for mounting astride the shaft, and each block having a level means to control rotational positioning of the block on the shaft.

21. An apparatus for aligning a pair of shaft comprising: a first block to mount on one of a pair of shafts to be aligned with said block having a V-shape to contact the shaft, a level on the block to assure horizontal mounting, means for fastening the positioned block onto the shaft, a surface parallel to the axis of the shaft and having a series of parallel lines near an edge of the block, and a secondsurface parallel to the axis of the shaft and adjacent the edge at 90 degrees from the first surface with said second surface having a series of parallel lines; and instrument means mounted near a second edge of the block; a second cooperating block to be mounted to the other shaft with said block having a V-shape, a level, and a fastening means as in the first block; a rod adjustably mounted to the second block to extend axially toward the first block, a bracket having a pair of clear members mounted at 90 degrees to each other on the end of the rod with the clear members each having a series of parallel lines; melans for extending the rod to place the clear lined members over the matching lined surfaces on the first block, to determine angular alignment of the shafts; a second rod extending from the second block to extend axially toward the frist block to become an aligning target for the instrument means to determine parallel alignment.

22. An apparatus for aligning a pair of shafts as in claim 21 wherein the instrument means comprises a microscope directed axially toward the second rod which has a cross hair for a target to compare with a cross hair inside the microscope.

23. An apparatus as in claim 22 further comprising means for adjustably rotating the lined clear members to calibrate the setting between the cooperating lined surfaces.

24. An apparatus as in claim 21 further comprising means for adjustably rotating the lined clear members to calibrate the setting between the cooperating lined surfaces.

25. An apparatus for aligning a pair of shafts as in claim 21 wherein the instrument means comprises: a first micrometer radially mounted with respect to the target rod, and a second micrometer radially mounted with respect to the target rod and at an angle of 90 degrees with respect to the first micrometer.

26. An apparatus as in claim 25 further comprising a ring having a circular outer surface located on the rod to be contacted by the micrometers.

27. An apparatus as in claim 25 further comprising means for adjustably rotating the lined clear members to calibrate the setting between the cooperating lined surfaces.

28. An apparatus for aligning a pair of shafts comprising: a pair of blocks, means for aligning a separate block of the pair to each of a pair of bearings holding a pair of coupled for rotating shafts, cooperating means extending between the two blocks with ronchi rulings along surfaces parallel to the axis of the shafts from one block over ronchi rulings in the second block for indicating angular misalignment by exhibiting a Moire fringe pattern, and a second cooperating means extending between the two blocks for measuring parallel alignment between the shafts.

29. A method of axially aligning a pair of coupled shafts at operating conditions utilizing a pair of aligning tools having cooperating measuring means for determining angular displacement from a horizontal and from a vertical direction by matching plates with ronchi rulings for displaying a Moire fringe pattern when angularly misaligned, and a cooperating measuring means for determining parallel displacement from a horizontal and from a vertical direction, with steps comprising: placing one of the aligning tools on a bearing holding one of the shafts; placing the other aligning tool on a bearing holding the other shaft; rotating the aligned shafts at operating speeds; matching angular displacement means in a horizontal and in a vertical direction and parallel displacement means in a horizontal and a vertical direction for determining if the shafts become misaligned due to thermal growth at operating conditions.

30. A method of axially aligning a pair of coupled shafts as in claim 29 with further steps of stopping shaft rotation and moving the axis of one of the shafts to correct misalignment, and again matching angular and parallel displacement means of the shafts at operating conditions.

* * * * *